United States Patent [19]
Ando et al.

[11] Patent Number: 4,757,190
[45] Date of Patent: Jul. 12, 1988

[54] OPTICAL CIRCUIT

[75] Inventors: Toshinobu Ando, Owariasahi; Koichi Isaji, Nagoya, both of Japan

[73] Assignee: Hitachi, Ltd., Tokyo, Japan

[21] Appl. No.: 819,040

[22] Filed: Jan. 15, 1986

[30] Foreign Application Priority Data

Feb. 23, 1985 [JP] Japan .................... 60-34861

[51] Int. Cl.$^4$ ............................................... G01J 1/32
[52] U.S. Cl. .................................. 250/205; 250/214 A
[58] Field of Search ............ 250/205, 231 SE, 237 G, 250/214 A; 340/347 P

[56] References Cited

U.S. PATENT DOCUMENTS

| 3,631,250 | 12/1971 | Buskirk | 250/205 |
| 4,041,502 | 8/1977 | Williams et al. | 250/573 |
| 4,281,325 | 7/1981 | Jarva | 250/205 |
| 4,352,013 | 9/1982 | Fasig et al. | 250/205 |

FOREIGN PATENT DOCUMENTS

| 1632778 | 4/1971 | Fed. Rep. of Germany . |
| 2410314 | 9/1975 | Fed. Rep. of Germany . |
| 3224531 | 1/1984 | Fed. Rep. of Germany . |

OTHER PUBLICATIONS

Siemens Halbleiter Schaltbeispiele, 1973, 74, Seiten, pp. 84, 85.

Primary Examiner—David C. Nelms
Assistant Examiner—Jessica Ruoff
Attorney, Agent, or Firm—Robert E. Bushnell

[57] ABSTRACT

A photosensor provided with a transistor having a bias element connected between the emitter and the collector, a light emitting element connected in series to said transistor, and a photosensitive element for receiving light emitted by said light emitting element and transforming it into electric current, with one end connected with said transistor. Owing to this construction, since only two interface lines are needed, one being the line for feeding the transistor with electric power and the other being the line of taking out the output of said photo sensitive element, the number of interface lines is reduced and thus the realization is simplified. Since the current flowing through the photosensitive element is so controlled that it is amplfiied and applied to the light emitting element, the output of the photosensitive element is considerably increased.

18 Claims, 2 Drawing Sheets

OPTICAL CIRCUIT

BACKGROUND OF THE INVENTION

This invention relates to an optical circuit and speaking more in detail, to a so-called photosensor including a light emitting element and a photosensitive element in order to detect an object in an optical manner.

Heretofore so-called photosensors are used for the purpose of detecting optically cards or sheets, or obtaining pulses by means of a disk having radial slits and secured to the rotating shaft of a motor.

A kind of photosensors hitherto widely utilized is described e.g. in Application Manual [Photointerrupter] SHARP (January, 1982) p. 26, FIG. 4-7(d). In this circuit a current is made flow through a light emitting diode from a power source $+V_{cc}$ through a resistor R and a voltage is applied to a phototransistor from the power source $+V_{cc}$ through another resistor. The light emitting diode emits light, when a current flows therethrough and the phototransistor is switched-on, when the light reaches it so that a current flows through this phototransistor from the power source $+V_{cc}$. Since the current amplification factor of the phototransistor is small, its output is amplified by a transistor in the succeeding stage and a waveform having a large amplitude is taken out. However, since the waveform includes distortions, the amplified output is further shaped in waveform by means of a Schmitt trigger element.

In addition, in this circuit structure, since the circuit comprising the light emitting element and that comprising the photosensitive diode are separated from each other with respect to the power supply, the interface for taking out the output should consist of 3 lines; i.e. power source line, collector line and earth line for the phototransistor.

Recent electronic apparatuses have a tendency to become more and more highly functional and many photosensors are incorporated here and there in the apparatuses. Consequently, since the number of interface signal lines increases proportionally thereto, assembling work for the signal lines in the apparatuses becomes tremendous.

SUMMARY OF THE INVENTION

An object of this invention is to provide an optical circuit permitting to reduction the number of interface signal lines.

Another object of this invention is to provide an optical circuit having an amplifier permitting amplification of electric current applied to the light emitting element in dependence upon the output of the photosensitive element.

Still another object of this invention is to provide a photosensor, in which the current through the light emitting element is increased by feeding back the current flowing through the photosensitive element to the light emitting element and thus the amount of emitted light is increased.

This invention is realized in an optical circuit provided with a light emitting element a photosensitive element, which receives light emitted by this light emitting element. Usually the light emitting element is a photodiode and the photosensitive element is a phototransistor. A current control circuit is connected in series with this light emitting element, which circuit controls current flowing through the light emitting element, depending on the current flowing through the photosensitive element. This current control circuit consists preferably of a bias element and a transistor serving as current amplifier means connected in parallel thereto.

Owing to such a construction as described above, the optical circuit is realized by 2 lines, i.e. one for feeding the light emitting element with electric power and the other for receiving signals from the photosensitive element.

Further, the path for the current flowing through the light emitting element and that for the current flowing through the photosensitive element constitute a feedback loop through the current control circuit. The output current of the photosensitive element is fed back to the light emitting element side. In this way, the current flowing through the light emitting element is amplified by the transistor and thus the amount of emitted light is increased so that the current intensity appearing at the output stage of the photosensitive element is considerably amplified. Consequently no amplifier circuit need be added to the output stage.

DESCRIPTION OF THE PREFERRED EMBODIMENT

Figure 1:
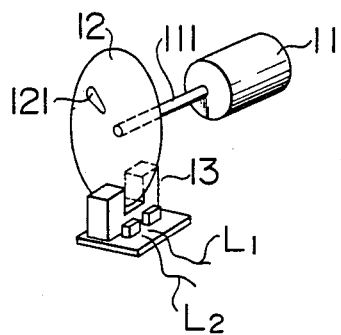
FIG. 1 is a perspective view of a mechanism for detecting the rotation of a motor, which is an example of applications of a photosensor.

FIG. 1 is a diagram showing a mechanism for detecting the number of rotations of a motor, which is an example of applications of a photosensor. A disk 12 having a hole 121 for detecting the phase of the rotating shaft 111 of a motor is mounted on the shaft. An optical object detection unit 13 for detecting optically the position of the hole formed in the disk 12 is so disposed that the disk 12 is inserted therein. Two signal lines $L_1$ and $L_2$ are taken out from this optical object detection unit 13.

In this unit 13 a light emitting element and a photosensitive element are disposed opposing to each other so that the disk 12 is held therebetween. In this way, when the hole 121 reaches the position therebetween in the course of the rotation of the motor 11, light emitted by the light emitting element is detected by the photosensitive element and a current corresponding to the amount of received light flows through the photosensitive element. In this way, the object, i.e. presence or absence of the hole formed in the disk 12 is detected.

Figure 2:
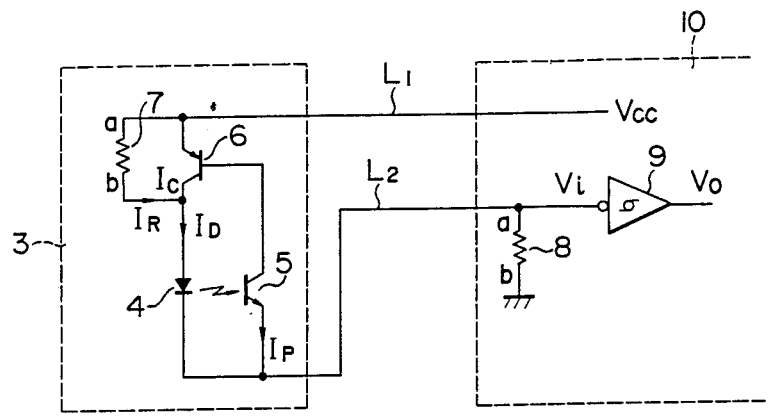
FIG. 2 is a circuit diagram for the optical detection circuit according to an embodiment of this invention.

FIG. 2 shows a specific optical detection circuit.

In FIG. 2, an optical object detection part 3 and a detection circuit 10 are indicated by broken lines, respectively. The detection circuit 10 is connected with the optical object detection part 3 by means of 2 signal lines; i.e. one $L_1$ coming from a power source $V_{cc}$ and the other $L_2$, which is the output line. The signal line $L_1$ is connected with the emitter of a transistor 6 and a terminal a of a bias element 7 in the optical object detection part 3. Further, the collector of the transistor 6 and the other terminal b of the bias element 7 are connected with each other and they are connected to the anode of a photodiode 4, which is the light emitting element. The base of the transistor 6 is connected with the collector of a phototransistor 5, which is the photosensitive element. In addition, the cathode of the light emitting element 4 and the emitter of the photosensitive element 5 are connected with each other and they are connected with the detection circuit 10 through the signal line $L_2$.

The signal line $L_2$ is connected with a terminal a of a load resistor 8 and the input of a Schmitt trigger element 9 in the detection circuit 10. In addition, the other terminal b of the load resistor 8 is connected to a reference potential such as "earth". In this way, in the optical object detection part 3, the path of the current flowing through the light emitting element 4 and that of the current flowing through the photosensitive element 5 constitute a feedback circuit. When the intensity of the light emitted by the light emitting element 4 increases, the amount of received light increases also and thus the intensity of the current flowing through the photosensitive element 5 increases. Consequently, this is fed back to the path of the current flowing through the light emitting element 4 through the transistor 6, which increases further the intensity of the light emitted by the light emitting element 4. In this way, since increase of the current is great owing to the feedback, it is not necessary to dispose an amplifier means for the output stage of the light receiving side, which was inevitable in the prior art techniques. In addition, since the interface signal line $L_2$ starts from the cathode of the photosensitive element 5, the number of signal lines is two, smaller than that needed according to the prior art techniques. By this fact reduction in size of the apparatus and in electric power consumption is realized.

Now the working mode of the circuit will be explained below.

Here it is supposed that among the resistance of the bias element 7, the resistance of the load resistor 8, the lower limit $V_{iL}$ and the upper limit $V_{iH}$ for the input voltage level the following relationship is valid;

$$V_{iL} > \frac{\text{Load resistance 8}}{\text{Resistance of bias element 7} + \text{Load resistance 8}} \times (V_{cc} - 1.2) \quad (1)$$

$$V_{iH} < V_{cc} - 1.2 \quad (2)$$

where 1.2 is an approximate value in Volt of the voltage drop in the light emitting element 4, in the case where an infra-red light emitting diode is used as the light emitting element 4. Furthermore it is supposed that the voltage drop in the transistor 6 is negligibly small.

Hereinbelow the working mode of the circuit indicated in FIG. 2 will be explained for a case in which it is applied to a mechanism for detecting the rotation of a motor 11.

When the part of the disk 12, where there is no hole, is located at the optical object detection part 3, no output current $I_p$ flows, because no light emitted by the light emitting element 4 reaches the photosensitive element 5. Therefore, the base current of the transistor 6 is "0" and the transistor 6 is cut off. On the other hand, the current $I_D$ flowing through the light emitting element 4 is equal to the current $I_R$ flowing through the bias element 7 and therefore the amount of emitted light is small. Consequently, the input voltage $V_i$ of the Schmitt trigger element 9 is at the "LOW" level according to the above-mentioned formula (1) and the output voltage $V_o$ of the Schmitt trigger element 9 is at the "HIGH" level.

Then, when the hole 121 in the disk 2 reaches the optical object detection part 3, light emitted by the light emitting element 4 arrives at the photosensitive element 5 and the current $I_p$ begins to flow. Since the photosensitive element 5 is connected with the base of the transistor 6, the collector current $I_C$ of the transistor 6 begins to flow. By this fact, the current $I_D$ flowing through the light emitting element 4 becomes $I_R + I_C$. Therefore, the amount of emitted light increases and thus $I_p$ augments further. This amount continues to augment, until the moment when the transistor 6 is saturated. At the moment when the transistor 6 is saturated, the input voltage $V_i$ of the Schmitt trigger element 9 becomes $V_i = (V_{cc} - 1.2)$ [V] and according to the above-mentioned formula (2) the output voltage $V_o$ of the Schmitt trigger element 9 becomes "LOW" level.

Figure 3:
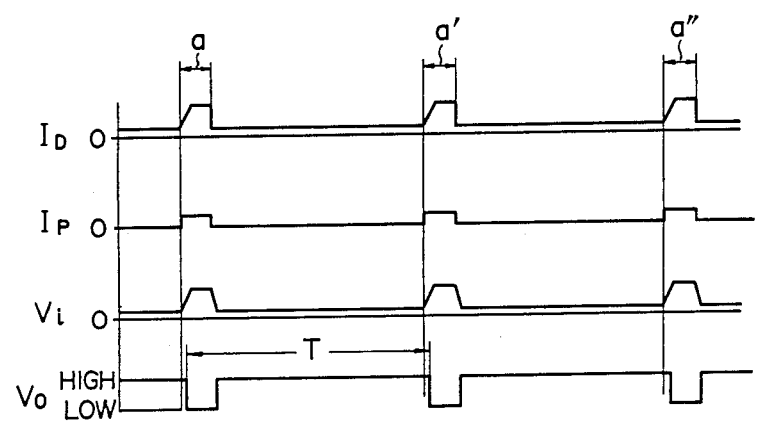
FIG. 3 is a time chart for explaining the working mode of the optical detection circuit indicated in FIG. 2.

FIG. 3 is a time chart indicating this relation. In FIG. 3, a, a' and a" on the abscissa are periods of time, during which the hole 121 in the disk is in the optical object detection part 3, and other parts are periods of time, during which the part where there is no hole is in the optical object detection part 3. The current $I_D$ flowing through the light emitting element 4 has a waveform distorted by the bias element 7 and the transistor 6, but pulses having no distortions and well shaped appear at the output $V_o$ after they have been inputted in the Schmitt trigger element 9. Further, at first only the current $I_D$ due to the bias element 7 flows through the light emitting element 4. When the photosensitive element 5 receives light emitted by the light emitted element 4, the current $I_p$ flowing through the photosensitive element 5 is fed back through the base of the transistor 6 and therefore the intensity of $I_D$ and $I_p$ increases further. This constitutes the input voltage $V_i$ for the Schmitt trigger element 9 in the detection circuit 10, and when this signal is outputted by the Schmitt trigger element 9, it is represented by a well shaped pulse voltage $V_o$. As it is clear from FIG. 2, when an object is inserted between the light emitting element 4 and the photosensitive element 5, electric power consumption is extremely low and thus the invention is efficacious for reduction of electric power consumption of the circuit. In addition, in FIG. 3, when the period of the output voltage $V_o$ of the Schmitt trigger element 9 (time from a to a') is measured, since the number of rotation f is equal to 1/T, the number of rotation of the motor 11 can be detected by using the inverse of the measured value of T.

Figure 4:
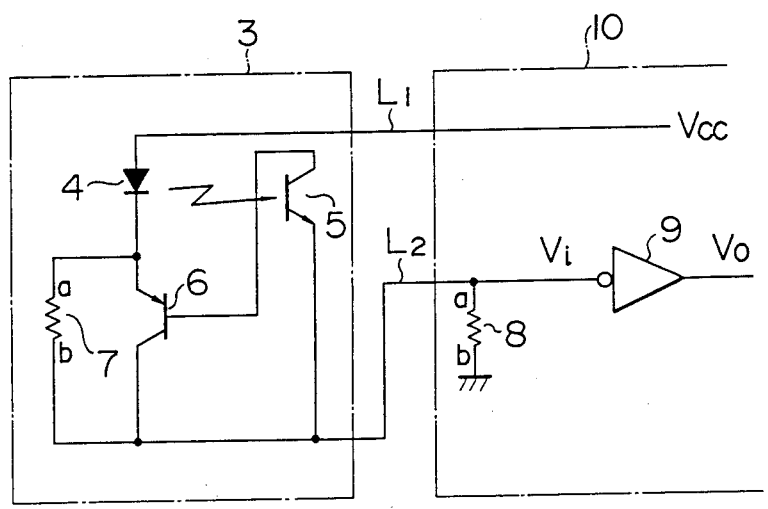
FIG. 4 is a circuit diagram for the optical detection circuit according to another embodiment of this invention.

FIG. 4 is a circuit diagram of the optical object detection circuit according to another embodiment of this invention.

In FIG. 4, the light emitting element 4 is arranged at the side of the power source ($V_{cc}$). That is, the signal line $L_1$ is connected with the anode of the light emitting element 4 and the cathode of the light emitting element 4 is connected with the emitter of the transistor 6 and the terminal a of the bias element 7. Further, the collector of the transistor 6, the terminal b of the bias element 7 and the emitter of the photosensitive element 5 is connected with the common signal line $L_2$. In addition, the collector of the photosensitive element 5 is connected with the base of the transistor, gist as for the circuit indicated in FIG. 2.

As explained above, according to the embodiments described above, a photosensor having only two interface signal lines is obtained. Furthermore, since the amplifier circuit, which was necessary in the output stage according to the prior art techniques, is no more needed, the circuit is simplified.

This invention is not limited to the embodiments described above, but this invention can be realized with many variations. One of the most usual variations is a circuit, in which the connection direction is inversed, as usually done in electronic circuits where transistors are used. That is, a connection at the collector side is changed to the emitter side, or an emitter-earthed circuit is changed to a collector-earthed one.

As other examples of modifications in the examples indicated in FIGS. 2 and 4, the bias element 7 is not always necessary, because leakage current flows usually through the transistor 6 and this current flows also through the light emitting element.

Furthermore, as another example of variations, in the circuit indicated in FIG. 2, the Schmitt trigger element 9 can be replaced by a comparator circuit while taking the relation in voltage level into account. Further, without making flow starting current by means of the bias element 7, it is possible to form the starting current by using external light or leakage current through the transistor 6 or the photosensitive element 5.

Still further, as an example of variations of the circuit indicated in FIG. 4, it is possible to compare the voltage coming from the signal line $L_1$ with an earthed voltage by connecting the signal line $L_2$ with frame earth and by replacing the Schmitt trigger element 9 in the detection circuit 10 by a comparator. In this way, only one signal line $L_1$ is necessary between the detection part 3 and the detection circuit 10.

We claim:

1. An optical circuit, comprising:
   means for providing electrical paths for electrical current, said providing means including:
   light emitting means emitting light depending on current flowing through said light emitting means;
   a bias element connected in series with said light emitting means for applying a current flow from a power source to said light emitting means;
   photosensitive means for receiving light emitted by said light emitting means and providing a current corresponding to the amount of light received;
   amplifier means for amplifying the current provided by said photosensitive means; and
   means for conducting a current amplified by said amplifier means to said light emitting means;
   output means connected in series with said providing means, for establishing an output signal representing the receipt of the light by said photosensitive means.

2. An optical circuit according to claim 1, further comprising:
   an interface line transmitting the output signal of said output means; and
   a Schmitt trigger element connected to an end of said interface line.

3. An optical circuit according to claim 1, wherein said amplifier means is a transistor and a bias element is connected in parallel to said transistor.

4. An optical circuit according to claim 3, further comprising an interface line, an end of said bias element as well as an end of said transistor being connected with said interface line.

5. An optical circuit according to claim 2, wherein said amplifier means is a transistor and a bias element is connected in parallel to said transistor, said transistor and said bias element being connected with a common interface line.

6. A photosensor, comprising:
   means for providing electrical paths for electrical currents, said providing means including:
   a first electric line supplying current from a power source;
   a current control element connected to said first electric line;
   a light emitting element having one end connected with said current control element, emitting light according the intensity of the current flowing through said current control circuit;
   a bias element connected in series with said light emitting element for applying a current from the power source to said light emitting element;
   a photosensitive element having one end connected with said light emitting element and receiving light emitted by said light emitting element, said photosensitive element making flow a current depending on the intensity of the received light, said current control element controlling the current flow through said light emitting element depending on the intensity of the current flowing through said photosensitive element; and
   a second electric line, to which both the other end of said light emitting and that of said photosensitive element are connected,
   output menas connected in series with said providing means for establishing an output signal representing the receipt of the light by said photosensitive element.

7. A photosensor according to claim 6, wherein said current control circuit comprises an amplifier circuit amplifying the current flowing through said photosensitive element, and a bias element connected in parallel with said amplifier circuit and applying the current transmitted by said first electric line to said light emitting element.

8. A photosensor according to claim 7, further comprising a Schmitt trigger element connected with one end of said second electric line.

9. A photosensor according to claim 8, wherein said amplifier circuit is a transistor.

10. A photosensor according to claim 7, wherein the other end of said second electric line is coupled to a reference potential.

11. A photosensor, comprising:
    means for providing electrical paths for electrical current, said providing means including:
    a first electric line supplying current from a power source;
    a light emitting element connected with said first electric line, emitting light depending on the intensity of the current flowing through said first electric line;
    a current bias element connected in series with said light emitting element for conducting current from the power source;
    a photosensitive element receiving light emitted by said light emitting elements and providing a current depending on the intensity of the received light; and
    an amplifier element interposed between said first electric line and said photosensitive element with one end of said emplifier element connected to said light emitting element and amplifying the current flowing through said photosensitive element to provide a current path to control application to said light emtiting element of said current flowing through said first electric line;

output means connected in series with said providing means, for providing an output signal representing the receipt of the light by said photosensitive element.

12. A photosensor according to claim 11, wherein said current bias element is connected in parallel to said amplifier element.

13. A photosensor according to claim 2, further comprising a Schmitt trigger element connected with said one end of said amplifier element.

14. An optical circuit according to claim 1, wherein:
said output means is serially coupled between said providing means and a reference potential;
said providing means is coupled between said power source and said output means; and
said amplifier means is interposed between said power source and said photosensitive means and provides a current path to control said current flowing through said light emitting means, whereby said current provided by said photosensitive means influences said control by said amplifier means of said current flowing through said current paths.

15. An optical circuit according to claim 6, wherein:
said output means is serially coupled between said providing means and a reference potential;
said providing means is coupled between said first electric line and said output means; and
said current control element is interposed between said first electric line and said photosensitive means.

16. An optical circuit according to claim 11, wherein:
said output means is serially coupled between said providing means and a reference potential;
said providing means is coupled between said first electric line and said output means; whereby said current provided by said photosensitive element influences said control by said amplifier element of application of current flowing through said first electric line to said light emitting element.

17. An optical sensing circuit, comprising:
a light emitting stage coupled between a source of electrical potential and a first junction, said stage including:
means for emitting light; and
bias means coupled in series with said light emitting means for establishing a bias potential between said source and said first junction;
light sensitive means disposed to receive light emanating from said light emitting means and having a first electrical terminal connected to said first junction, and a second electrical terminal, for providing an electrical current in response to reception of said light; and
amplifying means disposed between said second electrical terminal of said light sensitive means and said source of electrical potential and providing a current path to control electrical current from said source flowing through said light emitting means, for controlling said electrical current from said source, whereby said electrical current provided by said light sensitive means influences said control by said amplifying means of electrical current from said source flowing through said light emitting means.

18. An optical circuit according to claim 17, further comprised of output means connected between said first junction and a reference potential, for providing an output based on a characteristic of said electric current provided by said light sensitive means.

* * * * *